United States Patent
Kondo et al.

(10) Patent No.: US 9,047,000 B2
(45) Date of Patent: Jun. 2, 2015

(54) APPARATUS AND METHOD TO INPUT A POSITION AND SCROLLING A DISPLAYED IMAGE RELATIVE TO THE INPUT POSITION

(75) Inventors: Masao Kondo, Tokyo (JP); Kunihito Sawai, Kanagawa (JP); Yuichi Machida, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 800 days.

(21) Appl. No.: 13/276,891

(22) Filed: Oct. 19, 2011

(65) Prior Publication Data
US 2012/0105488 A1    May 3, 2012

(30) Foreign Application Priority Data
Oct. 27, 2010  (JP) .................................. 2010-240641

(51) Int. Cl.
G09G 5/00 (2006.01)
G06F 3/0488 (2013.01)
G06F 3/0485 (2013.01)
G06T 3/20 (2006.01)

(52) U.S. Cl.
CPC ............... *G06F 3/0488* (2013.01); *G06T 3/20* (2013.01); *G06F 3/0485* (2013.01)

(58) Field of Classification Search
CPC ..... G06T 3/20; G06F 3/0485; G06F 3/03547; G06F 3/0488
USPC .................................................. 345/672, 684
See application file for complete search history.

(56) References Cited

U.S. PATENT DOCUMENTS

| | | | | |
|---|---|---|---|---|
| 4,720,703 | A * | 1/1988 | Schnarel et al. | 345/163 |
| 6,097,387 | A * | 8/2000 | Sciammarella et al. | 715/784 |
| 6,198,473 | B1 | 3/2001 | Armstrong | |
| 7,274,377 | B2 * | 9/2007 | Ivashin et al. | 345/619 |
| 2002/0030667 | A1 * | 3/2002 | Hinckley et al. | 345/173 |
| 2006/0048071 | A1 | 3/2006 | Jarrett et al. | |
| 2006/0048072 | A1 | 3/2006 | Jarrett et al. | |
| 2006/0048073 | A1 | 3/2006 | Jarrett et al. | |
| 2007/0002018 | A1 | 1/2007 | Mori | |
| 2009/0083659 | A1 * | 3/2009 | Tatehata et al. | 715/784 |
| 2009/0235207 | A1 * | 9/2009 | Choi | 715/851 |
| 2010/0122205 | A1 | 5/2010 | Jarrett et al. | |

FOREIGN PATENT DOCUMENTS

| | | |
|---|---|---|
| JP | 2001-183151 | 7/2001 |
| JP | 2010-61617 | 3/2010 |

OTHER PUBLICATIONS

Extended Search Report issued Oct. 4, 2012 in European Patent Application No. 11185547.4.

* cited by examiner

*Primary Examiner* — Michelle L Sams
(74) *Attorney, Agent, or Firm* — Oblon, McClelland, Maier & Neustadt, L.L.P.

(57) ABSTRACT

An image processing apparatus includes a position movement input unit configured to receive a position movement instruction from a user, a pointer movement unit configured to set a position of a pointer that moves in accordance with the instruction, and a screen movement unit configured to scroll a screen based on a relative position of the pointer with respect to a reference point of a predefined area around the pointer, the screen movement unit configured to move the predefined area to keep the pointer inside the predefined area when the pointer is at a border of the predefined area and moves towards an outside of the predefined area.

18 Claims, 9 Drawing Sheets

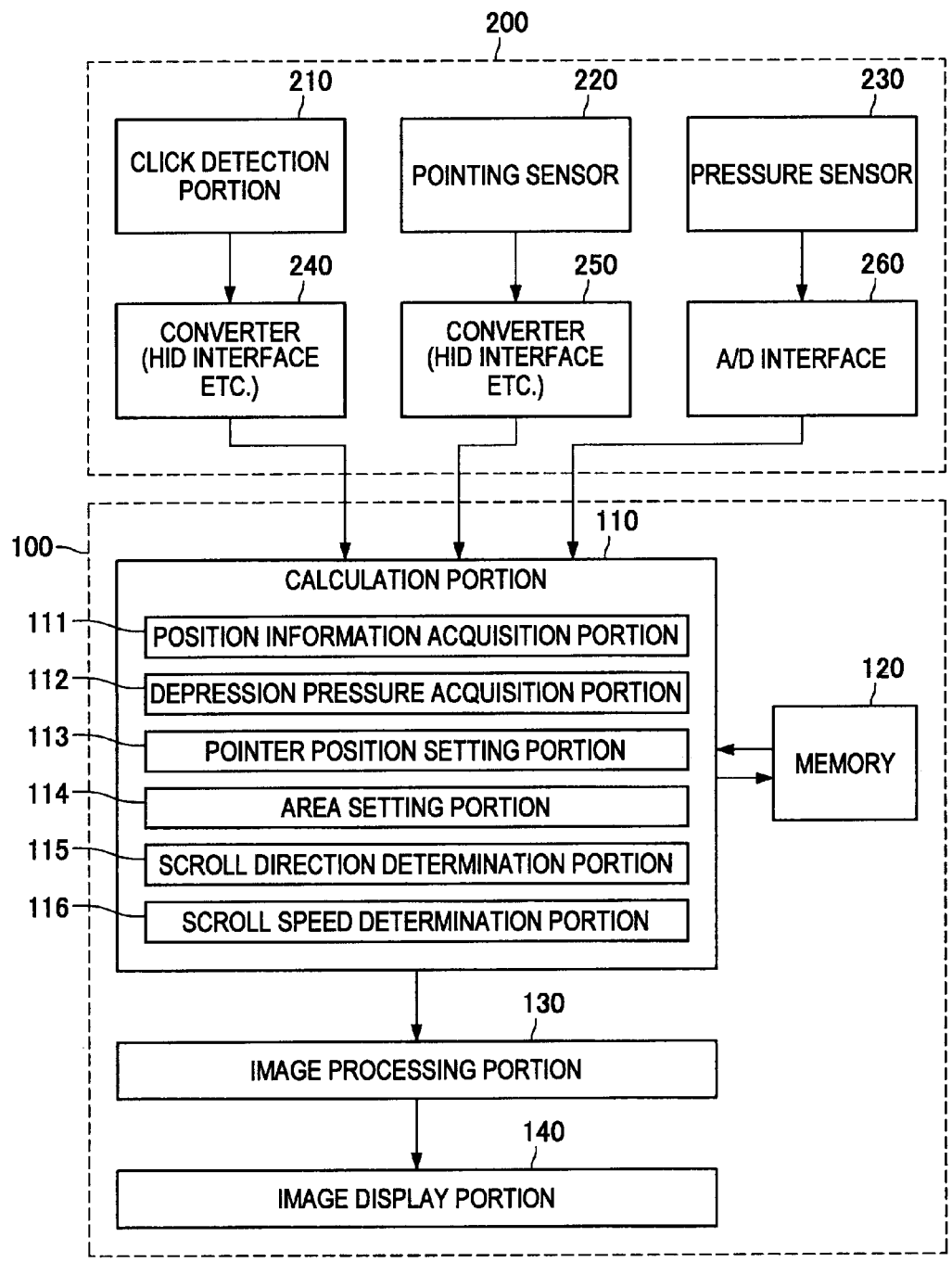

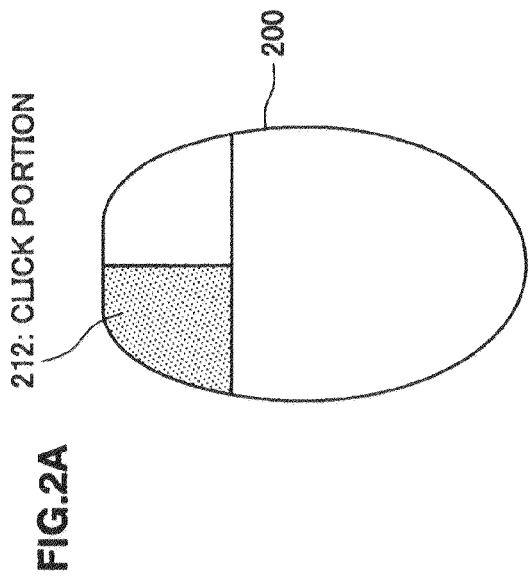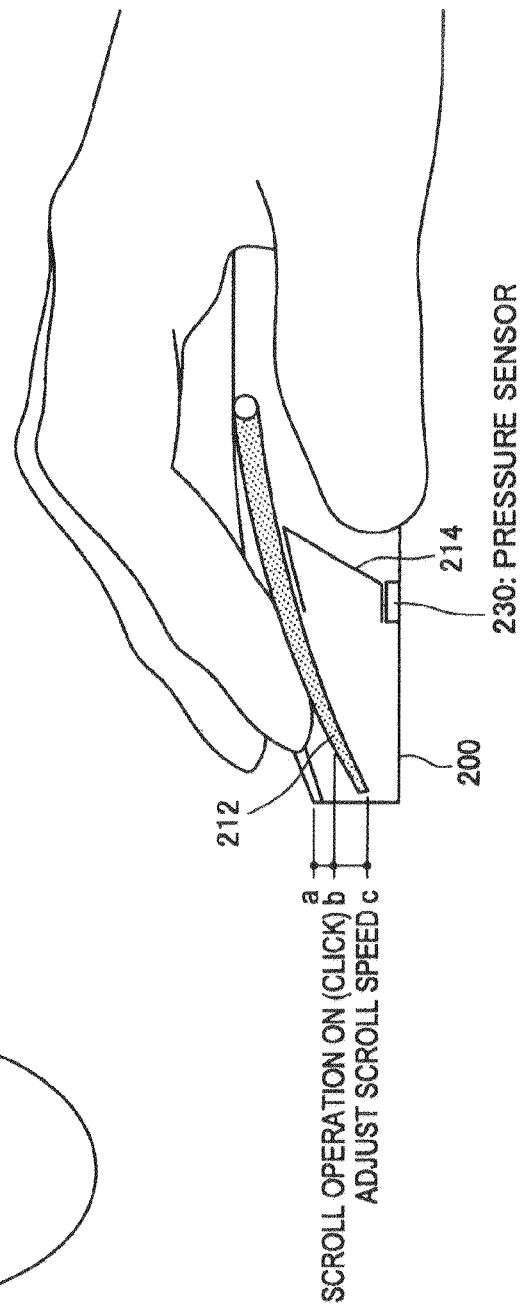

POSITION OF CIRCLE THAT DETERMINES SCROLL DIRECTION

```
this. onMouseDown = function(){
    c1._x = _xmouse
    c1._y = _ymouse
} c1kyori = Math.sqrt((Math.pow(c1._x-xmouse,2) + Math/pow(c1._y-ymouse,2)),2)
if(c1kyori <= r){
    c1._x = c1_x
    c1._y = c1_y
} if(c1kyori > r){
    deg = Math/PI*0.5 - Math.atan2(p1._x - c1._x , p2._y - c1._y)
    c1._x = p1._x - r*Math.cos(deg)
    c1._y = p1._y - r*Math.sin(deg)
}
```

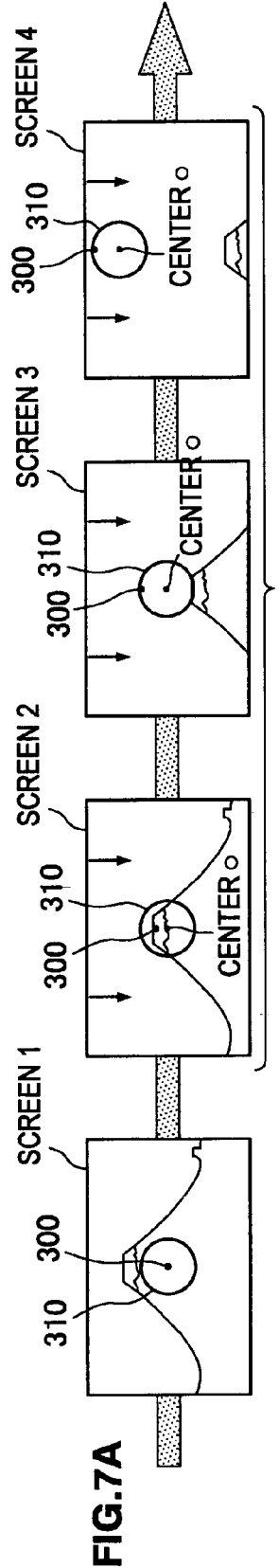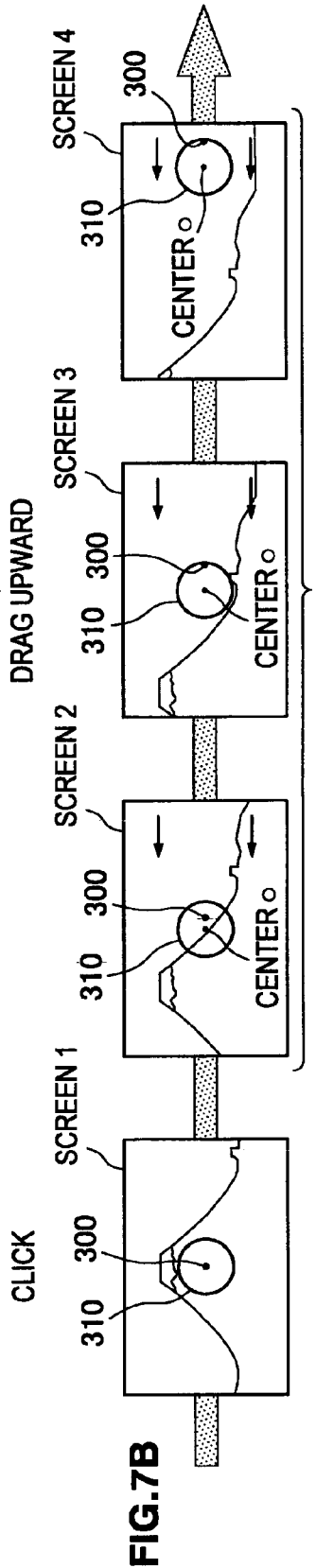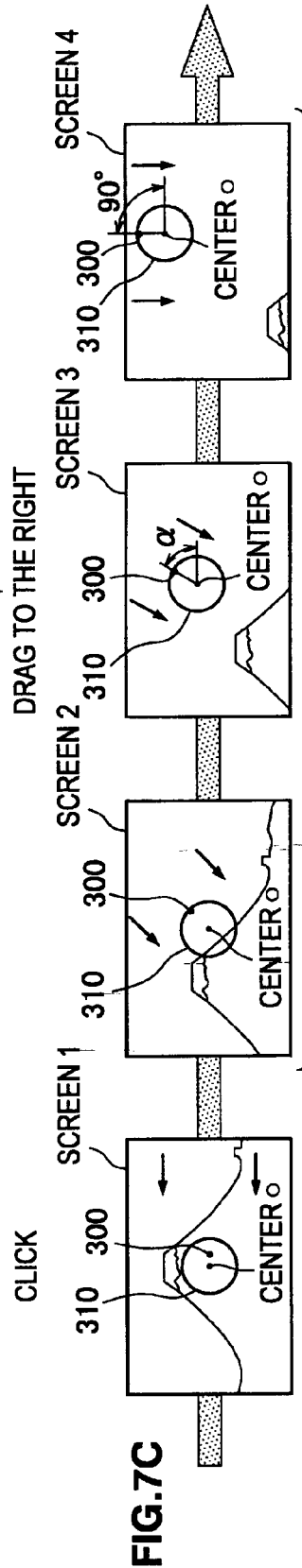

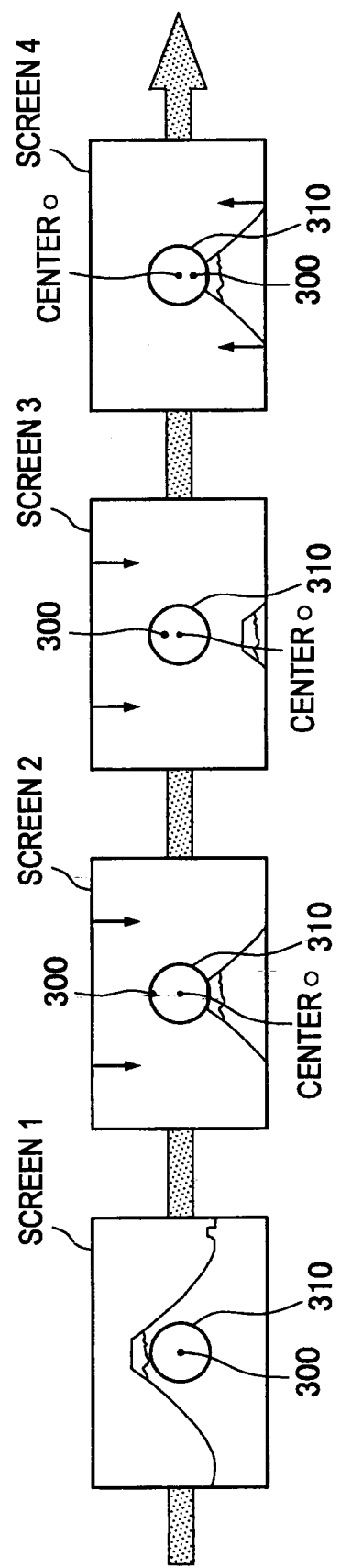

SCROLL DIRECTION →

APPARATUS AND METHOD TO INPUT A POSITION AND SCROLLING A DISPLAYED IMAGE RELATIVE TO THE INPUT POSITION

CROSS REFERENCE TO RELATED APPLICATIONS

The present disclosure claims the benefit of priority under 35 U.S.C. §119 and contains subject matter related to that disclosed in Japanese Priority Patent Application JP 2010-240641 filed in the Japan Patent Office on Oct. 27, 2010, the entire content of which is hereby incorporated by reference.

The present disclosure relates to an image processing device, an image processing system, an image processing method and a program.

BACKGROUND

Recently, with respect to devices such as a personal computer (PC), in order to realize operations by a user, a mouse is widely used along with a keyboard. By using the mouse, the user can easily perform click operations and screen scroll operations etc., while referring to a display screen. Technology is disclosed in Japanese Patent Application Publication No. JP-A-2010-61617, for example, in which it is assumed that a mouse is easily cradled.

SUMMARY

However, when performing a scroll operation of a screen, if an operation by the user is directly reflected in a scroll movement of the screen, small wobbles appear in the scroll movement of the screen, and visibility of the screen deteriorates. Similarly, if the operation by the user is directly reflected in the scroll movement of the screen, the scroll speed minutely fluctuates, and likewise visibility of the screen deteriorates. In addition, in scroll operations of a displayed image by a known mouse device etc., a scroll direction is calculated and determined by taking an absolute direction of a drag direction as a reference, and it is thus difficult to perform time series fine tuning of the scroll direction. Furthermore, in the scroll operations of the displayed image by the known mouse device etc., movement of a pointer on the screen and the scroll movement correspond to each other, and it is not possible, during scrolling, to move the pointer irrespective of a movement distance of the scroll.

Further, in the above-described known technology, when the screen is scrolled by the mouse, the scroll speed is determined by the speed at which the mouse is operated. In this case, if the user wishes to increase the scroll speed of the screen, it is necessary for the user to rapidly move the mouse that is placed on a desk or the like, thus requiring a complex operation. In particular, if the user wishes to increase a scroll amount on the screen and also to further increase the scroll speed, it is necessary to move the mouse rapidly over a comparatively long distance. Thus, a movement range of the mouse becomes extremely large and this may be a difficult operation on a desk etc. that has a limited space. For that reason, after the mouse has been moved, it is necessary to return the mouse to its original position and perform the scroll operation once more. Namely, it is necessary to perform the scroll operation divided into a plurality of operations, thus requiring an extremely complex operation.

In light of the foregoing, it is desirable to provide a novel and improved image processing device, image processing system, image processing method and program that are capable of significantly increasing operability of scrolling of a screen, and at the same time, are capable of improving visibility of the screen.

According to the present disclosure, it is possible to provide an image processing device, an image processing system, an image processing method and a program that are capable of significantly increasing operability of scrolling of a screen, and at the same time, are capable of improving visibility of the screen.

BRIEF DESCRIPTION OF THE DRAWINGS

FIG. 1 is a schematic diagram showing a configuration of a system according to an embodiment of the present disclosure;

FIG. 2A is a schematic diagram showing a configuration of an operation input device;

FIG. 2B is a schematic diagram showing the configuration of the operation input device;

FIG. 7A is a schematic diagram showing a state in which, when a position of the pointer is moved away from a center o of the circle, the screen is scrolled in the movement direction of the pointer with respect to the center o;

FIG. 7B is a schematic diagram showing a state in which, when the position of the pointer is moved away from the center o of the circle, the screen is scrolled in the movement direction of the pointer with respect to the center o;

FIG. 7C is a schematic diagram showing a state in which, when the position of the pointer is moved away from the center o of the circle, the screen is scrolled in the movement direction of the pointer with respect to the center o;

FIG. 8 is a schematic-diagram showing a case in which, after a scroll up operation, a scroll down operation is performed;

DETAILED DESCRIPTION OF THE EMBODIMENT(S)

Figure 3:
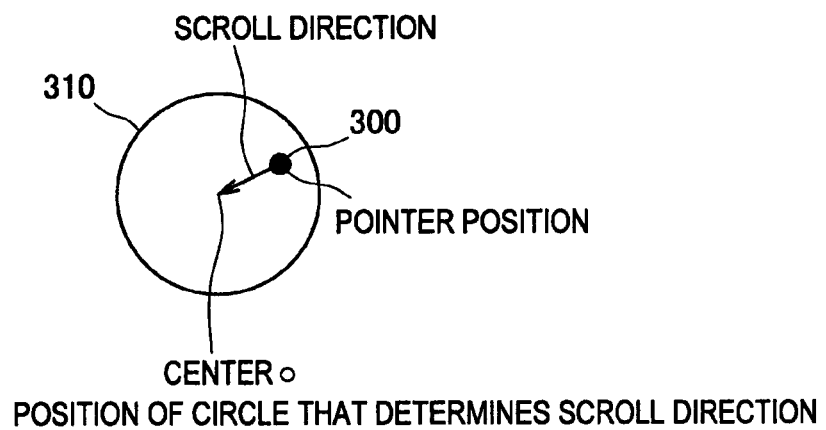
FIG. 3 is a schematic diagram illustrating a concept of a scroll operation.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The explanation will be made in the following order.

1. Configuration of system of present embodiment
2. Scroll operation of screen according to present embodiment 3. Adjustment of scroll speed
4. Processing in system of present embodiment

1. Configuration of System of Present Embodiment

First, a configuration of a system according to an embodiment of the present disclosure will be explained with reference to FIG. 1. As shown in FIG. 1, the system according to the present embodiment includes an information processing device 100 and an operation input device 200. The information processing device 100 is, for example, a device such as a personal computer (PC) or the like. The operation input device 200 is, for example, a device such as a mouse or the like. By a user operating the operation input device 200, this system can scroll a screen (for example, a map or the like) that is displayed on an image display portion 140 of the information processing device 100. Note that the operation input device 200 is not limited to the mouse. The operation input device 200 may be, for example, a device that is operated by another input portion, such as a touch panel, a keyboard or the like.

As shown in FIG. 1, the information processing device 100 includes a calculation portion 110, a memory 120, an image processing portion 130 and the image display portion 140. Further, the operation input device 200 includes a click detection portion (detection switch) 210, a pointing sensor 220, a pressure sensor 230, converters 240 and 250 and an A/D interface 260.

FIG. 2A and FIG. 2B are schematic diagrams showing a configuration of the operation input device 200 according to the present embodiment. Note that, in FIG. 2, the operation input device 200 is exemplified as a mouse, but the operation input device 200 is not limited to the mouse, and may be, for example, a keyboard-type input device, a touch panel-type input device or the like.

FIG. 2A shows a plan view of the operation input device 200 as seen from above. Further, FIG. 2B shows a state in which the operation input device 200 is seen from the side, when the user is operating the operation input device 200 using his/her hand.

As shown in FIG. 2A, an execute key (click portion) 212 is provided on the operation input device 200. By pressing the execute key 212, the user can perform a normal click operation. The click operation is detected by the click detection portion 210.

Furthermore, with the operation input device 200 of the present embodiment, the click operation is performed by depressing the execute key 212, and when the execute key 212 is further depressed, movement of the execute key 212 is transmitted by a plate spring 214 to the pressure sensor 230 and the depression is detected by the pressure sensor 230. The pressure detected by the pressure sensor 230 increases in accordance with an increase in the amount of depression of the execute key 212. Thus, the pressure sensor 230 can detect the pressure corresponding to the amount of depression of the execute key 212 by the user.

As a result, as shown in FIG. 2B, first, when the user depresses the execute key 212 from an initial state to a position "a," conduction occurs to a mechanical switch that is included in the click detection portion 210, and the click is detected. The click operation by the user is performed in this way. When the user depresses the execute key 212 further from the position "a," the pressure of the depression is detected by the pressure sensor 230. In this way, the pressure sensor 230 detects the pressure corresponding to the amount of depression of the execute key 212 by the user.

As will be explained in more detail later, in the present embodiment, a scroll speed is adjusted in accordance with the pressure corresponding to the amount of depression of the execute key 212 that is detected by the pressure sensor 230. Thus, the user can perform the click operation and can also adjust the scroll speed by operating the single execute key 212.

2. Scroll Operation of Screen According to Present Embodiment

Next, a scroll operation of the screen according to the present embodiment will be explained. FIG. 3 is a schematic diagram illustrating a concept of the scroll operation according to the present embodiment. As shown in FIG. 3, a pointer 300, which is moved in accordance with operation of the operation input device 200 by the user, is displayed on the image display portion 140 of the information processing device 100. Further, a virtual circle 310 that has a predetermined radius is set around the pointer 300. Note that the circle 310 is not normally displayed on the image display portion 140, but can be displayed on the image display portion 140 by a predetermined operation. Alternatively, the circle 310 may be constantly displayed. Further, any shape may be used for the virtual area 310. FIG. 3 shows one embodiment using a circle, but a square or any other shape may also be used.

Also, in the present embodiment, the scroll operation is performed in accordance with a positional relationship between the pointer 300 that is operated by the scroll operation of the operation input device 200 and the circle 310 that is set around the pointer 300. In particular, the scroll operation is performed based on a positional relationship between pointer 300 and a reference point of area 310. In one embodiment, area 310 is a circle and the reference point is the center of the circle 310. In other embodiments, a different reference point within area 310 may be used, such as when area 310 is not a circle.

In a general scroll operation, a screen is scrolled in response to movement of a pointer, when the pointer moves in accordance with a position of a mouse. In other words, the movement of the pointer and the scroll movement of the screen correspond to each other with a 1:1 ratio. On the other hand, in the present embodiment, the scroll operation is performed in accordance with a relative positional relationship between the movement of the pointer 300 and the virtual circle 310.

Figure 4:
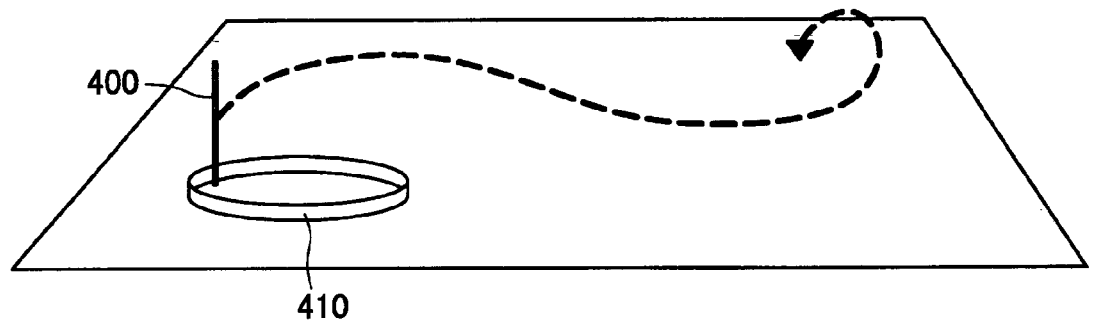
FIG. 4 is a schematic diagram showing a conceptual diagram that represents the scroll operation.

FIG. 4 is a schematic diagram showing a conceptual diagram of the scroll operation of the present embodiment. In the conceptual diagram shown in FIG. 4, the pointer 300 corresponds to an axis 400 and the circle 310 corresponds to a cylinder 410. In the conceptual diagram shown in FIG. 4, when the axis 400 moves, if the axis 400 comes into contact with an inner surface of the cylinder 410, the cylinder 410 moves along with the axis 400. On the other hand, when the axis 400 moves inside the inner area of the cylinder 410 and the axis 400 does not come into contact with the inner surface of the cylinder 410, only the axis 400 moves and the cylinder 410 does not move. In the present embodiment, as shown in this conceptual diagram, when the user moves the axis 400 (the pointer 300), the axis 400 moves inside the inner area of the cylinder 410, and when the cylinder 410 does not move, the screen is not scrolled. On the other hand, when the user moves the axis 400, if the axis 400 comes into contact with the inner surface of the cylinder 410 and the cylinder 410 moves along with the axis 400, the screen is scrolled.

Figure 5:
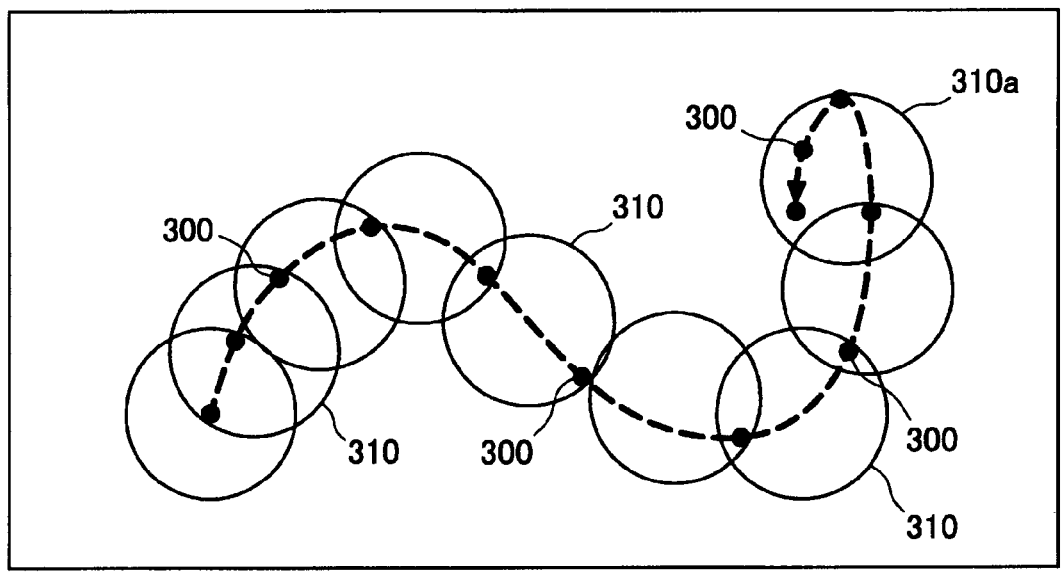
FIG. 5 is a schematic diagram showing a state in which, in accordance with the conceptual diagram shown in FIG. 4, a virtual circle is moved within a screen in response to a movement of a pointer.

FIG. 5 is a schematic diagram showing a state in which, in accordance with the conceptual diagram shown in FIG. 4, the virtual circle 310 moves within the screen in response to the movement of the pointer 300. First, in an initial state, the display screen is not set to a mode in which the screen is scrolled. For that reason, even if the user moves the operation input device 200 on top of a desk or the like, the screen is not scrolled and only the position of the pointer 300 moves in response to the position of the operation input device 200. When the user depresses the execute key 212 and performs the click operation, and the click operation is detected by the click detection portion 210, a state is achieved in which scrolling is possible (a state in which scrolling is active). In this state, when the user moves the operation input device 200 on top of the desk or the like, the pointer 300 moves inside the virtual circle 310. Then, as explained in the conceptual diagram shown in FIG. 4, if the pointer 300 (the axis 400) comes into contact with an outer contour of the virtual circle 310 (the cylinder 410), the circle 310 (the cylinder 410) moves along with the pointer 300 (the axis 400), in a movement direction of the pointer 300. Then, in the example shown in FIG. 5, the screen is scrolled along the movement direction of the circle 310. In other words, in FIG. 4, an operation to perform scrolling can be only realized if the cylinder moves along with the axis 400 when the user moves the axis 400. In this embodiment, the scrolling mode is entered based on the depression of execute key 212, as described above. However, in other embodiments, the scrolling mode may be activated by any input such as: depressing a specific button on the apparatus, depressing a specific button on the screen display, double-clicking a mouse button, or a specific tap operation on a touch screen.

According to this type of screen scroll operation, in the circle 310 shown in FIG. 5, the pointer 300 is in contact with the outer contour of the circle 310 and thus the circle 310 moves along with the movement of the pointer 300. The screen is scrolled in the movement direction of the circle 310. On the other hand, as shown by a circle 310a in FIG. 5, when the pointer 300 is moved inside the inner area of the circle 310a, the circle 310 does not move and the screen is not scrolled.

Figure 6:
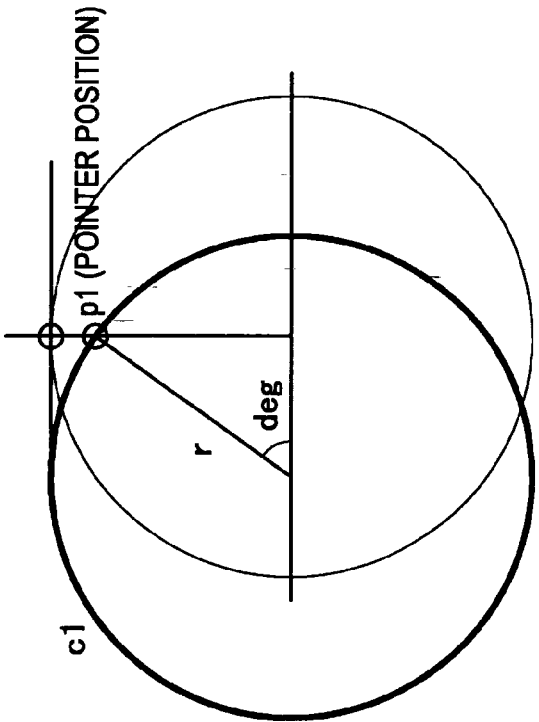
FIG. 6 is a schematic diagram showing an example of processing that calculates a position of the circle shown in FIG. 5.

FIG. 6 is a schematic diagram showing an example of processing to calculate the position of the circle 310 shown in FIG. 5, and shows a relational expression between the position of the pointer 300 and the circle 310 that determines the scroll direction. In FIG. 6, the circle 310 is represented by a circle c1, and the pointer 300 is represented by a pointer p1. Here, a center x coordinate of the circle c1 is represented by c1.$\_x$ and a center y coordinate of the circle c1 is represented by c1.$\_y$. A distance c1kyori between the pointer p1 that is positioned inside the circle c1 and the center of the circle c1 is calculated, and the distance c1kyori is compared with a radius of the circle c1. When the distance c1kyori≤r, the circle c1 does not move, and the values of c1.$\_x$ and c1.$\_y$ do not change On the other hand, when the distance c1kyori>r, the pointer p1 is positioned outside of the circle c1, and thus the circle c1 moves in response to the position of the pointer p1. Here, an angle deg of the position of the pointer p1 is calculated using the following expression.

$$deg = Math.P1*0.5 - Math.a\tan 2(p1.\_x - c1.\_x, p2.\_y - c1.\_y)$$

Then, as shown in FIG. 6, the values of c1.$\_x$ and c1.$\_y$ each vary according to the cosine component and the sine component of the angle deg. A new position of the circle c1 can be calculated in this way.

In FIG. 5, the screen is scrolled when the circle 310 moves along with the pointer 300. On the other hand, the screen may not be scrolled when the position of the pointer 300 matches a center o of the circle 310, and the screen may be scrolled in the movement direction of the pointer 300 with respect to the center o when the position of the pointer 300 moves away from the center o of the circle 310.

FIG. 7A to FIG. 7C are schematic diagrams showing states in which, when the position of the pointer 300 is moved away from the center o of the circle 310, the screen is scrolled in the movement direction of the pointer 300 with respect to the center o. In the examples shown here, cases are explained in which a screen displaying an image of "Mt. Fuji" is scrolled.

FIG. 7A shows a case in which the screen is scrolled in the upward direction. First, as shown on a screen 1, when the execute key 212 of the operation input device 200 is clicked, a state is achieved in which scrolling is possible. In this state, as shown on a screen 2, when the position of the pointer 300 is moved above the center o, the screen is scrolled in the movement direction of the pointer 300 with respect to the center o. Therefore, a range of the screen is scrolled in the upward direction, and a whole screen that includes "Mt. Fuji" moves in the downward direction (in the direction of the arrows).

Next, as shown on a screen 3, when the position of the pointer 300 is moved further upward inside the circle 310 while the scroll operation is being performed, the pointer 300 comes into contact with an edge (the outer contour) of the circle 310. In this state also, similarly to the screen 2, the screen is scrolled in the upward direction and "Mt. Fuji" moves down.

Next, in the state in which the pointer 300 is in contact with the edge of the circle 310, if the pointer 300 is moved further in the upward direction, both the pointer 300 and the circle 310 move in the upward direction inside the screen, as shown on a screen 4. Thus, as shown on the screen 4, the pointer 300 and the circle 310 are positioned above center inside the screen. In this state also, similarly to the screen 2 and the screen 3, the screen is scrolled in the upward direction and "Mt. Fuji" moves down.

FIG. 7B shows a case in which the screen is scrolled to the right. First, as shown on a screen 1, when the execute key 212 of the operation input device 200 is clicked, a state is achieved in which scrolling is possible. In this state, as shown on a screen 2, when the position of the pointer 300 is moved to the right of the center o, the screen is scrolled in the movement direction of the pointer 300 with respect to the center o. Therefore, a range of the screen is scrolled to the right, and the whole screen that includes "Mt. Fuji" moves to the left (in the direction of the arrows).

Next, as shown on a screen 3, when the position of the pointer 300 is moved further to the right inside the circle 310 while the scroll operation is being performed, the pointer 300 comes into contact with the edge (the outer contour) of the circle 310. Even in this state, similarly to the screen 2, the screen is scrolled to the right and "Mt. Fuji" moves to the left.

Next, in the state in which the pointer 300 is in contact with the edge of the circle 310, if the pointer 300 is moved further to the right, both the pointer 300 and the circle 310 move to the right within the screen, as shown on a screen 4. Thus, as shown on the screen 4, the pointer 300 and the circle 310 are positioned to the right of center within the screen. In this state also, similarly to the screen 2 and the screen 3, the screen is scrolled to the right and "Mt. Fuji" moves to the left.

FIG. 7C shows a case in which the screen is scrolled in a parabola shape such that it is scrolled from the right to the upward direction. First, as shown on a screen 1, when the execute key 212 of the operation input device 200 is clicked, a state is achieved in which scrolling is possible, and the screen is scrolled to the right by moving the pointer 300 to the right with respect to the center o of the circle 310. In this state, as shown on a screen 2, when the position of the pointer 300 is moved from the right side to the upward right direction inside the circle 310, the range of the screen is scrolled upward and to the right, and the whole screen that includes "Mt. Fuji" moves downward and to the right (in the direction of the arrows).

Next, as shown on a screen 3, when the position of the pointer 300 is moved upward inside the circle 310 while the scroll operation is being performed, the scroll direction changes to a direction of the position of the pointer 300 with respect to the center o of the circle 310 (a direction of an angle α). Thus, the direction of the scroll is changed to a more upward direction.

Next, as shown on a screen 4, when the position of the pointer 300 is moved to an uppermost portion inside the circle 310 while the scroll operation is being performed, the scroll direction changes to the direction of the position of the pointer 300 with respect to the center o of the circle 310 (a 90 degree direction). In this way, the scroll direction is in the upward direction (the direction of the arrows shown on the screen 4) and "Mt. Fuji" moves down.

It should be noted that the scroll direction may be 90 degrees when the position of the pointer 300 enters a predetermined range centering around the direction of 90 degrees (for example, a range from 85 degrees to 95 degrees). In this way, the user can perform the scroll in the 90 degree direction without precisely setting the position of the pointer 300 to the 90 degree direction. By performing similar processing with respect to a horizontal direction and a 45 degree direction and so on, the user can perform the scroll in a desired direction without precisely setting the position of the pointer 300 to the desired direction.

FIG. 8 shows a case in which, after a scroll up operation, a scroll down operation is performed. First, as shown on a screen 1, when the execute key 212 of the operation input device 200 is clicked, a state is achieved in which scrolling is possible. In this state, as shown on a screen 2, when the position of the pointer 300 is moved upward from the center o of the circle 310, the screen is scrolled in the movement direction of the pointer 300 with respect to the center o. Therefore, the range of the screen is scrolled in the upward direction, and the whole screen that includes "Mt. Fuji" moves in the downward direction (in the direction of the arrows) (in the same manner as the screen 3 in FIG. 7A).

Next, a screen 3 shows a state in which the position of the pointer 300 is moved downward inside the circle 310, from the state shown on the screen 2. In this state also, the position of the pointer 300 is positioned above the center o, and thus the screen is scrolled in the movement direction of the pointer 300 with respect to the center o. Therefore, the screen is scrolled in the upward direction and "Mt. Fuji" moves in the downward direction (in the direction of the arrows). Thus, on the screen 3, the user is moving the pointer 300 in the downward direction, but the screen is scrolled in the upward direction.

Next, a screen 4 shows a state in which, continuing from the state shown in the screen 3, the pointer 300 is moved downward inside the circle 310, and the pointer 300 is positioned below the center o of the circle 310. In this way, when the pointer 300 is positioned below the center o of the circle 310, the screen is scrolled in the downward direction and "Mt. Fuji" moves in the upward direction (in the direction of the arrows).

As described above, in the present embodiment, the movement of the pointer 300 does not correspond completely to the scroll direction, and the scroll direction of the screen is reversed by moving the position of the pointer 300 to an opposite side with respect to the center o. In other words, in the present embodiment, the scroll direction is determined by the position of the pointer 300 with respect to (the center o of) the circle 310. In this way, in comparison with a case in which a pointer operation and a screen scroll movement are matched, scrolling can be performed more smoothly and a smooth scroll operation is possible. Further, minute movements of the operation input device 200 by the user do not have an impact on the scroll movement, and the scrolled screen can thus be viewed more easily. In addition, by assigning a function to a change in a continuous drag direction and a change in a scroll direction, time series fine tuning of the scroll direction is possible. Further, by combining the operation input device 200 that incorporates the pressure sensor 230 with the information processing device 100, during scrolling, the pointer 300 can be moved irrespective of the movement distance of the scroll, and thus, even when scrolling, the pointer 300 can be rapidly moved to a desired position.

3. Adjustment of Scroll Speed

Next, a method will be explained to adjust a scroll speed in the system according to the present embodiment. In the present embodiment, the pressure sensor 230 of the operation input device 200 detects a pressure depending on a depression amount of the execute key 212. A detected pressure value is transmitted from the operation input device 200 to the information processing device 100.

In the information processing device 100, based on the pressure value transmitted from the operation input device 200, the scroll speed is made faster the larger the pressure value is. Namely, the larger the depression amount of the execute key 212, the faster the scroll speed. In this way, the user can freely adjust the scroll speed depending on operation of the execute key 212.

4. Processing in System of Present Embodiment

Next, processing to realize the above-described scroll operations will be explained. Operations of the operation input device 200 by the user are detected by the click detection portion 210, the pointing sensor 220 and the pressure sensor 230. A click operation by the execute key 212 (depression to a position b in FIG. 2B) is detected by the click detection portion 210, converted to a digital signal by the converter 240 and transmitted to the information processing device 100. Further, a position of the operation input device 200 itself (in the horizontal direction) is detected by the pointing sensor 220, converted to a digital signal by the converter 250 and transmitted to the information processing device 100. In addition, a pressure when the execute key 212 is depressed further than the position b shown in FIG. 2B is detected by the pressure sensor 230, converted to a digital signal by the A/D interface 260 and transmitted to the information processing device 100.

The signals that are transmitted from the operation input device 200 are input into the calculation portion 110 of the information processing device 100. As shown in FIG. 1, the calculation portion 110 includes a position information acquisition portion 111, a depression pressure acquisition portion 112, a pointer position setting portion 113, an area setting portion 114, a scroll direction determination portion 115 and a scroll speed determination portion 116. Until a signal indicating that a click has been performed is received from the converter 240, the calculation portion 110 does not set a screen to a scrolling mode. Thus, the calculation portion 110 displays the pointer 300 on the screen, based on position information of the operation input device 200 transmitted from the converter 250.

When the calculation portion 110 receives, from the converter 240, a signal indicating that a click has been performed, the calculation portion 110 sets the screen to a mode in which scrolling is possible and scrolls the screen in accordance with the position of the operation input device 200. More specifically, when the calculation portion 110 receives, from the converter 240, the signal indicating that the click has been performed, the calculation portion 110 sets the screen to the mode in which scrolling is possible, and stores a position of the pointer 300 on the screen at that point in time in the memory 120. The calculation portion 110 further stores, in the memory 120, the position of the pointer 300 on the screen at the time the click is performed, as a position of the circle 310. In addition, the calculation portion 110 stores display content of the whole screen in the memory 120 at a predetermined sampling interval.

The position information acquisition portion 111 of the calculation portion 110 acquires, at a predetermined sampling interval, the position of the operation input device 200 detected by the pointing sensor 220 and stores the acquired value in the memory 120. Then, every time the position of the operation input device 200 is newly acquired, the calculation portion 110 compares the newly acquired position with the previously acquired position and calculates a difference between the two positions. Further, the calculation portion 110 acquires the position of the pointer 300 on the screen at a predetermined sampling interval, and stores the acquired value in the memory 120. Then, the pointer position setting portion 113 of the calculation portion 110 moves the pointer 300 from the previous position of the pointer 300 by the above-described difference, and calculates a new position of the pointer 300. The new position of the pointer 300 is transmitted to the image display portion 140.

In addition, the area setting portion 114 of the calculation portion 110 calculates the position of the new circle 310 based on the new position of the pointer 300 and sets the circle 310. When, depending on the new position of the pointer 300, the pointer 300 is in contact with the edge of the circle 310 and the circle 310 moves along with the pointer 300, the new position of the circle 310 is stored in the memory 120 at a predetermined sampling interval. Further, the new position of the circle 310 is transmitted to the image processing portion 130.

In addition, the scroll direction determination portion 115 of the calculation portion 110 calculates a scroll direction of the screen depending on a relationship between the position of the pointer 300 and the position of the circle 310, and transmits a calculation result to the image processing portion 130. The depression pressure acquisition portion 112 acquires the pressure value that is detected by the pressure sensor 230 and transmitted from the converter 250. The scroll speed determination portion 116 of the calculation portion 110 calculates a scroll speed of the screen based on the pressure value detected by the pressure sensor 230, and transmits the scroll speed to the image processing portion 130.

Note that, in the above-described example, the scroll speed is changed depending on the depression amount of the execute key 212, but the scroll speed may be changed depending on the positional relationship between the pointer 300 and the circle 310. For example, the scroll speed determination portion 116 may increase the scroll speed the further the pointer 300 moves away from the center o of the circle 310, and may maximize the scroll speed when the pointer 300 comes into contact with the outer contour of the circle 310.

The image processing portion 130 performs processing to move the position of the pointer 300 in accordance with the new position of the pointer 300 transmitted from the calculation portion 110. In addition, the image processing portion 130 performs processing to move the position of the circle 310 in accordance with the new position of the circle 310 transmitted from the calculation portion 110. Further, the image processing portion 130 performs processing to scroll the display content of the whole screen that is saved in the memory 120, in accordance with information relating to the scroll operation (the scroll direction and the scroll speed) that is transmitted from the calculation portion 110. Results of the above-described processing by the image processing portion 130 are transmitted to the image display portion 140 and a new screen is displayed on the image display portion 140. The amount of scroll can be determined by the scroll speed and by a time period during which the scroll is instructed. Note that, as described above, the virtual circle 310 need not be normally displayed and may be displayed when a specific key is operated.

Figure 9:
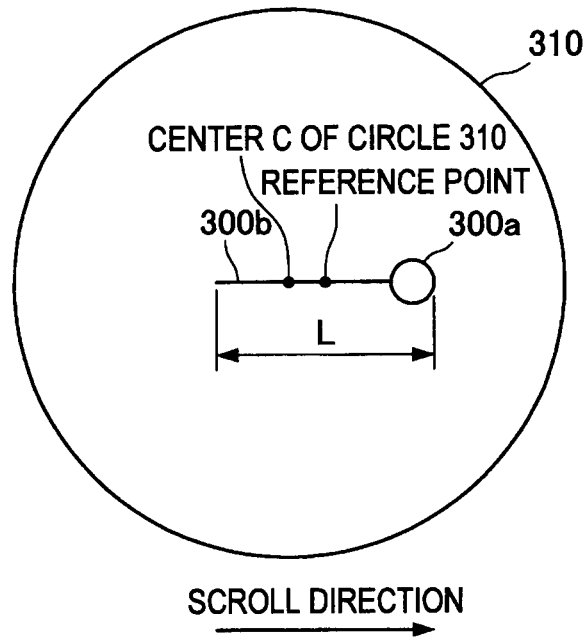
FIG. 9 is a schematic diagram showing in detail the pointer displayed inside the circle.

FIG. 9 is a schematic diagram showing in detail the pointer 300 displayed inside the circle 310. As shown in FIG. 9, the pointer 300 is displayed by a circle 300a, which is positioned at a leading end of the scroll direction, and a tail 300b. The tail 300b is arranged in parallel to the scroll direction. Thus, by visually verifying the circle 300a and the tail 300b, the user can visually ascertain the scroll direction in an instant.

Figure 10:
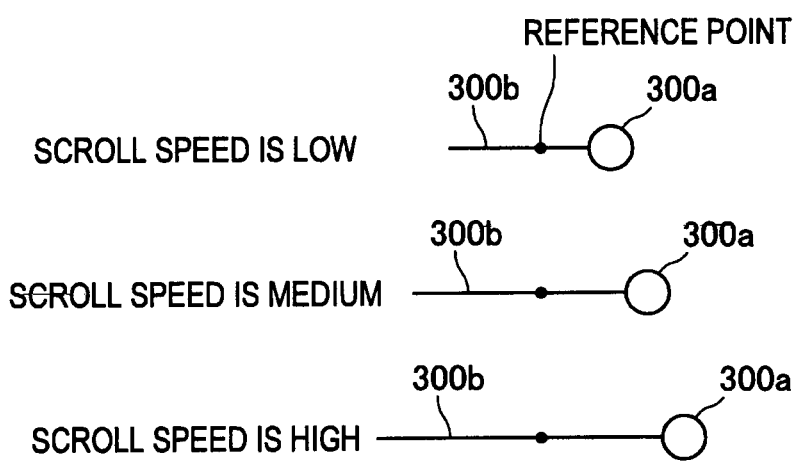
FIG. 10 is a schematic diagram showing a state in which a length L of the pointer becomes larger the faster a scroll speed, taking a midpoint of the length L as a reference.

Further, as shown in FIG. 9, a length L from a leading edge of the circle 300a to a rear end of the tail 300b indicates the scroll speed. As shown in FIG. 10, a midpoint of the length L is taken as a reference point and the faster the scroll speed, the longer the length L. Thus, by visually verifying the length L, the user can visually verify the scroll speed in an instant. Note that the above-described image processing is performed based on results of the processing by the calculation portion 110 and the image processing portion 130.

Figure 11:
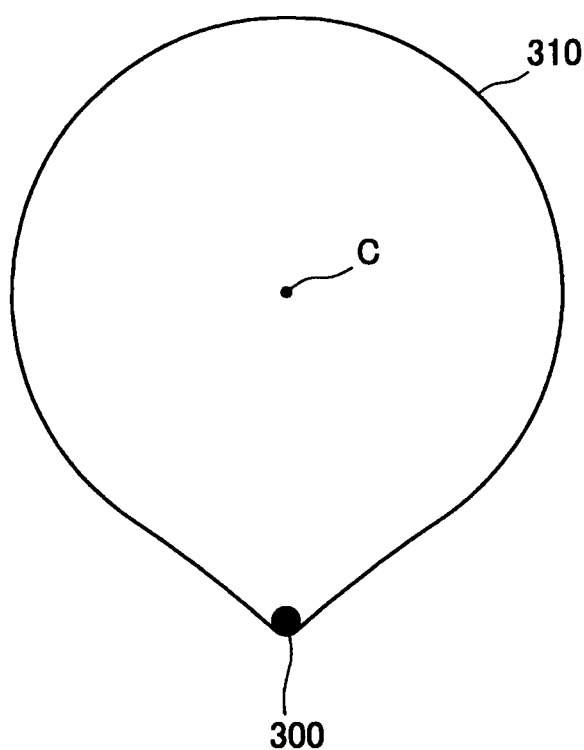
FIG. 11 is a schematic diagram showing an example in which a shape of the circle is deformed, when the circle is displayed on the screen.

FIG. 11 is a schematic diagram showing an example in which the shape of the circle 310 is deformed when the circle 310 is displayed on the screen. As shown in FIG. 11, after the pointer 300 has come into contact with the outer contour of the circle 310, when the pointer 300 is further moved toward the outside of the circle 310, the image processing portion 130 may perform processing such that the location at which the pointer 300 has come into contact with the circle 310 is deformed toward the outside. With this type of configuration, when the circle 310 and the pointer 300 are both displayed, the position of the pointer 300 can be recognized from the deformed shape of the circle 310 and it is thus possible to recognize the scroll direction of the screen from the deformed shape of the circle 310.

As described above, according to the present embodiment, as the screen scroll is controlled in accordance with the positional relationship between the pointer 300 and the virtual circle 310, it is possible to inhibit the operations of the user from being directly reflected in the scroll movement on the screen. As a result, the screen scroll can be performed more smoothly and it is possible to significantly enhance the visibility of the screen. In addition, in the scroll operation of the displayed image by the pointing device (the operation input device 200), operability of the scroll operation can be improved by the image processing system correcting the scroll direction in accordance with changes over time of the position of the pointer 300 when a drag operation is performed.

In addition, as the scroll speed can be controlled depending on the amount of depression of the execute key 212, the scroll speed can be freely controlled while an operation amount (a movement amount in the horizontal direction) of the operation input device 200 is kept to a minimum. Thus, the scroll speed can be controlled without performing a complex operation. As the operation input device 200 that has the pressure sensor 230 in an operation portion detects the pressure by user operation, and the scroll speed of the displayed image is calculated, it is possible to realize the scroll speed that accords with the user's intention The exemplary embodiment of the present disclosure is described above in detail with reference to the appended drawings. However, the present disclosure is not limited to these examples. It should be understood by those skilled in the art that various modifications, combinations, sub-combinations and alterations may occur depending on design requirements and other factors insofar as they are within the scope of the appended claims or the equivalents thereof.

The invention claimed is:

1. An image processing apparatus comprising:
a position movement input device configured to receive a position movement instruction; and
processing circuitry configured to
set a position of a pointer that moves in accordance with the position movement instruction;
scroll a screen based on a relative position of the pointer with respect to a reference point in a predefined area around the pointer; and
move the predefined area and maintain the pointer inside the predefined area to keep the pointer inside the predefined area when the pointer is at a border of the predefined area and moves towards an outside of the predefined area, wherein a shape of the predefined area is maintained.

2. The apparatus according to claim 1, wherein the predefined area has a circular shape.

3. The apparatus according to claim 1, wherein the reference point is a center point of the predefined area.

4. The apparatus according to claim 1, wherein the processing circuitry is further configured to move the reference point with the predefined area.

5. The apparatus according to claim 1, wherein the processing circuitry is further configured to scroll the screen in a horizontal direction when the pointer is moved in a predetermined range centered around the horizontal direction.

6. The apparatus according to claim 1, wherein the position movement input device is a touch panel.

7. The apparatus according to claim 1, wherein the processing circuitry is further configured to scroll the screen based on the relative position of the pointer with respect to the reference point when a predetermined input is detected.

8. The apparatus according to claim 7, wherein the reference point moves with the pointer according to the position movement instruction when the predetermined input is not detected.

9. The apparatus according to claim 1, wherein a scroll speed of the screen is determined by the relative position of the pointer with respect to the reference point.

10. The apparatus according to claim 1, wherein a scroll direction of the screen is determined by the relative position of the pointer with respect to the reference point.

11. The apparatus according to claim 1, wherein the processing circuitry is further configured to display an image of the pointer on the screen.

12. The apparatus according to claim 1, wherein the processing circuitry is further configured to display an image of the predefined area on the screen.

13. The apparatus according to claim 1, wherein the position movement input device further comprises:
a sensor configured to sense an amount of pressure exerted by a user on the position movement input device, and
a scroll speed of the screen is determined by the amount of pressure sensed by the sensor.

14. The apparatus according to claim 13, wherein the processing circuitry is further configured to scroll the screen faster when the amount of pressure sensed by the sensor increases.

15. The apparatus according to claim 1, wherein the processing circuitry is further configured to scroll the screen based on the relative position of the reference point.

16. The apparatus according to claim 1, wherein the processing circuitry is further configured to
display an image of a second area on the screen, the second area overlapping the predefined area; and
modify a shape of the second area on the screen when the pointer contacts the border of the predefined area.

17. An image processing method comprising:
receiving a position movement instruction;
setting, by circuitry, a position of a pointer that moves in accordance with the position movement instruction;
scrolling, by the circuitry, a screen based on a relative position of the pointer with respect to a reference point of a predefined area around the pointer; and
moving, by the circuitry, the predefined area and maintaining the pointer inside the predefined area to keep the pointer inside the predefined area when the pointer is at a border of the predefined area and moves towards an outside of the predefined area, wherein a shape of the predefined area is maintained.

18. A non-transitory computer readable medium encoded with computer readable instructions which, when loaded onto a processor, cause the processor to perform a method, the method comprising:
receiving a position movement instruction;
setting a position of a pointer that moves in accordance with the position movement instruction;
scrolling a screen based on a relative position of the pointer with respect to a reference point of a predefined area around the pointer; and
moving the predefined area and maintaining the pointer inside the predefined area to keep the pointer inside the predefined area when the pointer is at a border of the predefined area and moves towards an outside of the predefined area, wherein a shape of the predefined area is maintained.

* * * * *